United States Patent
Netsu

(10) Patent No.: US 7,442,031 B2
(45) Date of Patent: Oct. 28, 2008

(54) BLOW MOLDING APPARATUS

(75) Inventor: Yoichi Netsu, Nagano (JP)

(73) Assignee: Frontier Inc., Nagano (JP)

( * ) Notice: Subject to any disclaimer, the term of this patent is extended or adjusted under 35 U.S.C. 154(b) by 0 days.

(21) Appl. No.: 11/837,516

(22) Filed: Aug. 11, 2007

(65) Prior Publication Data

US 2007/0286920 A1    Dec. 13, 2007

Related U.S. Application Data

(62) Division of application No. 10/531,574, filed as application No. PCT/JP03/14230 on Nov. 7, 2003, now Pat. No. 7,311,515.

(30) Foreign Application Priority Data

Nov. 8, 2002    (JP)    ............... 2002-325050

(51) Int. Cl.
 - *B29C 49/36*    (2006.01)
 - *B29C 49/68*    (2006.01)
 - *B29C 49/56*    (2006.01)

(52) U.S. Cl. ............. 425/526; 198/377.03; 198/377.07; 425/534; 425/540; 425/541

(58) Field of Classification Search ................. 425/526, 425/534, 540, 541; 198/377.03, 377.07
See application file for complete search history.

(56) References Cited

U.S. PATENT DOCUMENTS

| | | | |
|---|---|---|---|
| 3,877,861 A * | 4/1975 | Kiefer et al. ................. | 425/541 |
| 4,005,966 A | 2/1977 | Nutting | |
| 4,355,968 A | 10/1982 | Lagoutte et al. | |
| 4,479,772 A | 10/1984 | Kleimenhagen | |
| 4,929,450 A * | 5/1990 | Takakusaki et al. ......... | 425/526 |
| 5,039,298 A | 8/1991 | Takakusaki et al. | |
| 5,116,217 A * | 5/1992 | Doudement et al. ......... | 425/534 |
| 5,326,250 A | 7/1994 | Doudement | |
| 5,346,386 A | 9/1994 | Albrecht et al. | |
| 5,683,729 A | 11/1997 | Valles | |
| 5,863,571 A * | 1/1999 | Santais et al. ................ | 425/526 |
| 5,975,278 A * | 11/1999 | Ruth ..................... | 198/377.01 |
| 6,152,723 A | 11/2000 | Winter et al. | |
| 6,345,713 B1 * | 2/2002 | Ronchi .................. | 198/377.03 |

FOREIGN PATENT DOCUMENTS

| | | |
|---|---|---|
| EP | 1 070 579 A1 | 1/2001 |
| JP | 5-041420 B2 | 6/1993 |
| JP | 6-015724 A | 1/1994 |
| JP | 6-039909 A | 2/1994 |
| JP | 11-115039 A | 4/1999 |
| JP | 2000-117821 A | 4/2000 |

* cited by examiner

*Primary Examiner*—Robert B Davis
(74) *Attorney, Agent, or Firm*—Buchanan Ingersoll & Rooney PC

(57) ABSTRACT

A blow molding apparatus that includes a preform supplying station for supplying preforms in an upright state, a heating station for heating the preforms to a suitable temperature condition for blow-molding while transporting the preforms, a blow station for blowing the heated preforms to form blow-molded products, and a collection station for collecting the blow-molded products.

11 Claims, 10 Drawing Sheets

BLOW MOLDING APPARATUS

TECHNICAL FIELD

The present invention relates to a blow molding apparatus that manufactures plastic containers such as PET bottles by heating and blow-molding preforms that are primary molded products. In more detail, the invention relates to a transfer mechanism for changing the feed pitch of the preforms in such blow molding apparatus, an inverting transfer mechanism for inverting the preforms or blow-molded products, and an opening/closing mechanism of blow-molding molds that open laterally.

BACKGROUND ART

Various kinds of biaxial stretch blow molding apparatus for manufacturing blow-molded products such as PET bottles are known, and such apparatuses fundamentally include a preform supplying station, a heating station for heating preforms, a blow station equipped with blow-molding molds that biaxially stretch the heated preforms by blowing, and a collection station that collects blow-molded products from the blow-molding mold. One example of such a biaxial stretch blow molding apparatus of this construction has been proposed by the present applicant in Reference Document 1 indicated below. A rotary-type device where a plurality of blow-molding molds are mounted on a turntable at intervals of a fixed angle is also known as the blow station.

In the blow molding apparatus of this construction, a large number of preforms can be heated efficiently and apparatus size can be reduced by transporting the preforms with a narrow feed pitch within the heating station. When the preforms are transferred from the heating station to the blow station after heating, it is necessary to increase the feed pitch so as to match the feed pitch of the blow-molding molds. As disclosed in Reference Document 2 indicated below, as one example of a mechanism for transporting the preforms while increasing the feed pitch, a mechanism in which preforms that are transported along a circular transportation passage with a narrow feed pitch are gripped by gripper devices transported along a separate circular transportation passage with a large feed pitch is known. The gripper devices are each held by a swing mechanism that swings the gripper device in a lateral direction and a linear movement device that linearly moves the gripper device in a anteroposterior direction, and are constructed so that when preforms are received, the respective gripper devices are transported while receiving the preforms so as to have the same feed pitch as the preforms transported with the narrow feed pitch in this movement mechanism.

The preforms are transported via the heating station and the blow station while being held with an inverted posture on carriers. Normally, preforms supplied from the preform supplying station with an upright posture are inverted, mandrels are inserted into opening parts of the preforms from below, and the preforms are thereafter transported in this state. After blow-molding has been carried out by the blow-molding molds to produce blow-molded products, the mandrels are withdrawn downward from the opening parts of the blow-molded products, and then the blow-molded products are inverted and collected in the collection station. A mechanism for inverting and placing preforms in the carriers is also disclosed in Reference Document 2 indicated below.

As the blow-molding mold, a construction that opens and closes a left/right pair of molding dies in the lateral direction to open and close the mold is known. As a mold opening mechanism for the blow-molding mold of this construction, devices that use a link mechanism are disclosed in Reference Documents 3 and 4 indicated below, for example.
Reference Document 1: JP-A 2000-117821
Reference Document 2: JP-A 11-115039
Reference Document 3: JP-A 6-15724
Reference Document 4: JP-A 6-39909

In the transfer mechanisms for changing the pitch described above, the gripper devices are positioned by a combined movement of swing movement by the swing mechanism and linear movement by the linear transfer mechanism. However, to position the gripper devices at a receiving position and a transfer position of the preforms using such combined movement, component parts of the respective mechanisms need to be precisely manufactured and also precisely assembled. Accordingly, there is the problem that manufacturing is difficult and the manufacturing cost is high.

In addition, when preforms and blow-molded products are transferred between circular transportation passages, the gripper devices should preferably face one another on both sides in a radial direction of the transportation passages. However, in conventional mechanisms, the gripper devices are oriented toward the radial direction only at the moment when the preforms and the like are transferred. This means that there is the risk that it will not be possible to transfer the preforms and the like reliably.

Also, the conventional blow molding apparatus requires separate turntables for carrying out operations that invert the preforms, invert the blow-molded products, insert mandrels into the performs, and withdraw the mandrels from the blow-molded products. As described above, a mechanism that changes the feed pitch of the preforms and also inverts the preforms has been proposed, but fundamentally four turntables are required, so that there is the problem that the dimensions of the machine increase, as does the manufacturing cost.

In the mold opening/closing mechanism for blow-molding molds that can open and close laterally in the conventional blow molding apparatus, the link mechanism comprising the mold opening/closing mechanism extends from rear surfaces of the respective blow-molding molds in a planar direction toward a center of the turntable that rotates the respective blow-molding molds. Here, a large number of heavy blow-molding molds are mounted on the turntable and the transporting of the respective blow-molding molds needs to be carried out precisely. Accordingly, it is preferable for bearing members that rotatably supports the turntable to be disposed as close as possible to a position directly below heavy objects, that is, directly below the blow-molding molds on the turntable. However, since the conventional mold opening/closing mechanism is elongated in the planar direction toward the center of rotation of the turntable from the respective blow-molding molds, there is the problem that in order to avoid interference with the mold opening/closing mechanism, the bearing members have to be positioned close to the center of rotation of the turntable.

DISCLOSURE OF THE INVENTION

In view of the above problems, it is an object of the present invention to provide a transfer mechanism of a blow molding apparatus that can change the feed pitch of preforms and the like that are transported along a circular transportation passage using a simple mechanism and can also reliably transfer and receive preforms and the like.

It is another object of the present invention to provide an inverting transfer mechanism of the blow molding apparatus wherein a mechanism for inverting preforms and blow-molded containers, a mechanism for inserting mandrels of a carrier into performs, and a mechanism for withdrawing the mandrels of the carrier downward from the blow-molded containers are formed on a single turntable.

It is yet another object of the present invention to provide a mold opening/closing mechanism of the blow molding apparatus that makes it possible for a bearing that supports a turntable on which blow-molding molds are mounted to be disposed close to a position that is directly below the blow-molding molds.

It is yet another object of the present invention to provide a blow molding apparatus that is small and compact and can also efficiently and reliably transport preforms and blow-molded products.

To solve the problems described above, a blow molding apparatus according to the present invention that includes a preform supplying station that supplies preforms in an upright state, a heating station that heats the preforms to a suitable temperature condition for blow-molding while transporting the preforms, a blow station that blows the heated preforms to form blow-molded products, and a collection station that collects the blow-molded products includes:

a first circular transportation passage that transports the preforms supplied from the preform supplying station at a first feed pitch;

a first transfer mechanism that receives the preforms from the first circular transportation passage and changes the feed pitch to a second feed pitch that is wider than the first feed pitch while transporting the preforms along a second circular transportation passage;

an inverting transfer mechanism that receives the preforms transported at the second feed pitch from the second circular transportation passage, inverts the preforms to an inverted state while transporting the preforms along a third circular transportation passage, and then inserts mandrels into opening parts of the preforms in the inverted state from below;

a second transfer mechanism that receives, from the third circular transportation passage, the preforms transported in a state where the mandrels are inserted and changes the feed pitch from the second feed pitch to the first feed pitch while transporting the preforms along a fourth circular transportation passage;

an arc-shaped transportation passage part that is formed in the heating station and receives the preforms in the state where the mandrels are inserted from the fourth circular transportation passage; and a third transfer mechanism that receives the heated preforms from the arc-shaped transportation passage part and changes the feed pitch from the first feed pitch to the second feed pitch while transporting the preforms along a fifth circular transportation passage, wherein in the blow station, the preforms transported at the second feed pitch along the fifth circular transportation passage are received by blow-molding molds that are transported at the second feed pitch along a sixth circular transportation passage;

the inverting transfer mechanism receives the blow-molded products from the blow-molding molds, withdraws the mandrels inserted in the opening parts of the blow-molded products in an inverted state downward while transporting the blow-molded products along the third circular transportation passage, and then inverts the blow-molded products in the inverted state to the upright state; and the blow-molded products are collected from the inverting transfer mechanism to the collection station.

Figure 1:
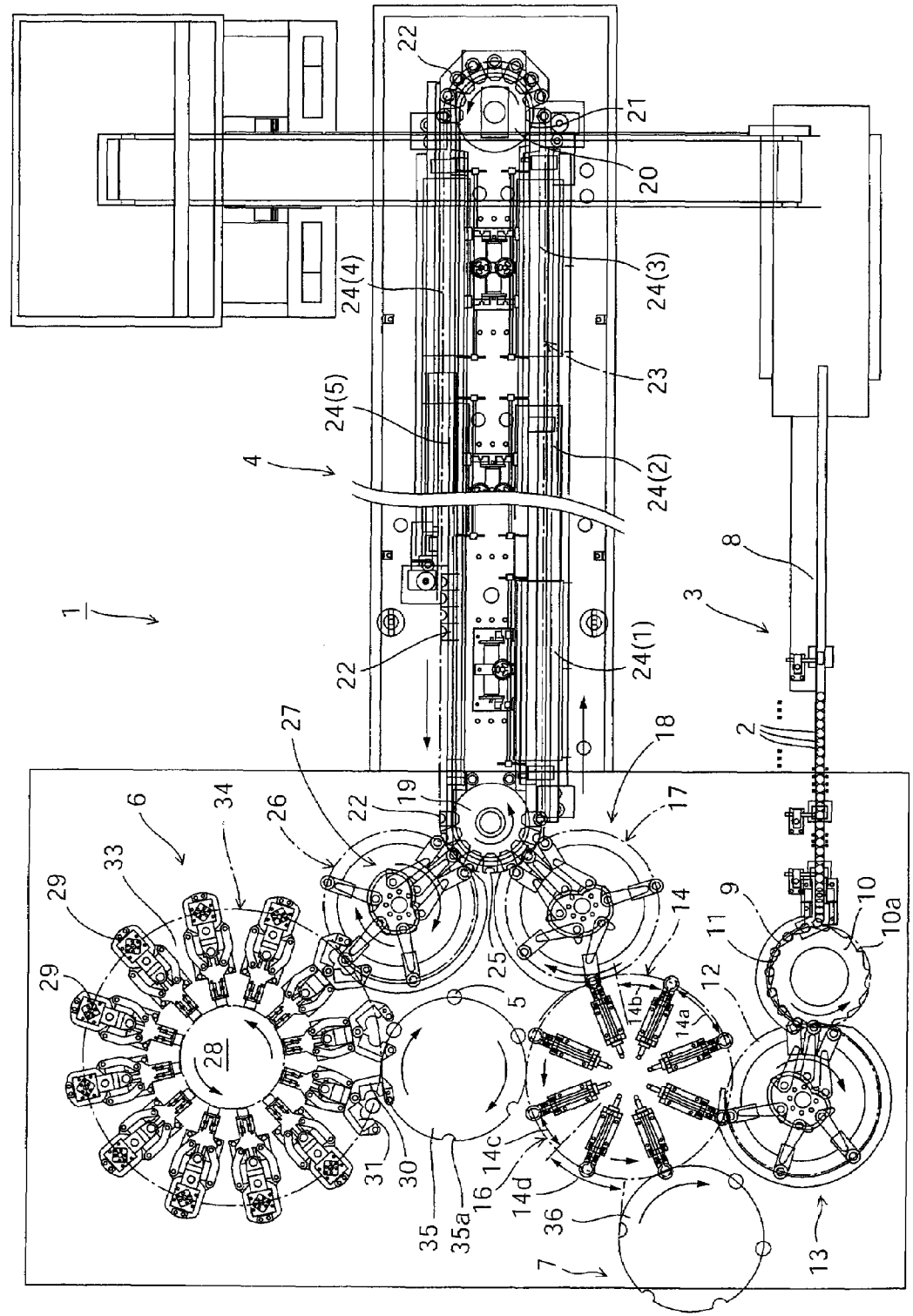
FIG. 1 is a plan view schematically showing an overall construction of a biaxial stretch blow molding apparatus according to an embodiment of the present invention.

DESCRIPTION OF THE NUMERALS 1 biaxial stretch blow molding apparatus
2 preform
2a opening part
2b flange
3 preform supplying station
4 heating station
5 PET bottle
6 blow station
7 collection station
9 first circular transportation passage
12 second circular transportation passage
13 first transfer mechanism
14 third circular transportation passage
15 mandrels
16 inverting transfer mechanism
17 fourth circular transportation passage
18 second transfer mechanism
25 transportation passage part
26 fifth circular transportation passage
27 third transfer mechanism
28 turntable
28a central rotational axis
29 blow-molding mold
30, 31 left/right molding dies
33 mold opening/closing mechanism
34 sixth circular transportation passage
40 apparatus base
43 turntable
44 circular guide rail
45 slider
46 holding plate
46a holding groove
47 pivot pin
49 swinging arm
50 slide-type connecting part 51 elongated slot
52 cam follower pin
53 cam mechanism
55 deformed heart-shaped cam groove
56 cam follower
63 turntable
65 cylindrical member
65a axis line
66 slide shaft
67 link mechanism
68 gripper
68a, 68b opening/closing arms
71 slider
72 first cam follower
73 second cam follower
74 first cam groove
75 second cam groove
81 cylindrical cam surface
82 roller
83 coil spring
85 mandrel holder
86 guide shaft
87 vertical slider
88 cam follower
89a cylindrical cam groove
91 thrust bearing
94, 95 mold support members
94a, 95a pin holes
96 vertical shaft
97 mold support plate
98 vertical moving shaft
99 slide guide
100 slider
101 linking arm
102 opening/closing link mechanism
103, 104 operation arms
110 vertical moving cam mechanism
111 cam follower
113 cylindrical cam groove
114 vertical slider
120 closing mechanism
121 stopping pin
121a groove
122 locking mechanism
123 cam mechanism
124 ball
125 coil spring
126 cam follower
127 cam groove

BEST MODE FOR CARRYING OUT THE INVENTION

Embodiments of a blow molding apparatus according to the present invention will be described with reference to the drawings.

(Overall Structure)

FIG. 1 is a plan view schematically showing an overall construction of a biaxial stretch blow molding apparatus according to an embodiment of the present invention. In the illustrated example, a biaxial stretch blow molding apparatus 1 is a manufacturing apparatus for PET bottles used for drinks, for example, and has a preform supplying station 3 that supplies preforms 2, a heating station 4 that heats the preforms 2 to a temperature state suitable for blow-molding while transporting the preforms 2, a rotary-type blow station 6 that molds PET bottles 5 (blow-molded products) by blowing the heated preforms 2, and a collection station 7 that collects the PET bottles 5. The preform supplying station 3 includes a guide rail 8 that is inclined downward towards a supplying end, with flanges 2b of opening parts 2a of each preform 2 hung from the guide rail 8 and the preforms 2 in this upright state sliding downward along the guide rail 8 due to their own weight (the preforms 2 are described later with reference to FIG. 3, for example).

A first circular transportation passage 9 that transports the preforms 2 supplied from the preform supplying station 3 at a first feed pitch p1 is formed horizontally at a lower end of the guide rail 8 of the preform supplying station 3. The first circular transportation passage 9 includes a turntable 10 in whose outer circumferential surface 10a ratchet-type feed grooves are formed at intervals equal to the first feed pitch and an arc-shaped guide surface 11 formed so as to face the outer circumferential surface 10a of the turntable 10 and to cover an angle of around 180°. The preforms 2 are sent along the first circular transportation passage 9 with the first feed pitch p1 in a state where the opening parts 2a are held between the turntable 10 and the arc-shaped guide surface 11.

A first transfer mechanism 13, which receives the preforms 2 from the first circular transportation passage 9 and changes the feed pitch thereof from the first feed pitch p1 to a wider second feed pitch p2 while transporting the preforms 2 along a second circular transportation passage 12 circumscribed about the first circular transportation passage 9 is disposed at a position adjacent to the first circular transportation passage 9.

Also disposed is an inverting transfer mechanism 16 that receives the preforms 2 transported with the second feed pitch p2 from the second circular transportation passage 12 and inverts the preforms 2 to an inverted state while transporting the preforms 2 along a third circular transportation passage 14 circumscribed about the second circular transportation passage 12, and then inserts mandrels 15 (see FIG. 4) into the opening parts 2a of the preforms 2 in the inverted state from below.

Also disposed is a second transfer mechanism 18 that receives the preforms 2 transported from the third circular transportation passage 14 in a state where the mandrels 15 are inserted into the opening parts 2a, or in other words, receives the mandrels 15 transported in a state in which the preforms 2 are inserted therein, and restores the feed pitch to the first feed pitch p1 from the second feed pitch p2 while transporting the preforms 2 along a fourth circular transportation passage 17 circumscribed about the third circular transportation passage 14.

Here, the heating station 4 has a driving sprocket 19 and a driven sprocket 20, a chain 21 that is suspended between the sprockets, and mandrel carriers 22 that are attached to the chain 21 at fixed intervals, with the mandrel carriers 22 being transported along a transporting path 23 of a flat oval shape. The transporting path 23 includes a semicircular transportation passage part 25 (an arc-shaped transportation passage part) that receives the preforms 2 from the fourth circular transportation passage 17 of the second transfer mechanism 18 and causes the preforms 2 to be supported on mandrel carriers 22. A plurality of heating sections 24(1) to 24(5) are disposed along the transporting path 23 and while the respective mandrel carriers 22 that have received the preforms 2 from the second transfer mechanism 18 are transported along the transporting path 23, the mandrel carriers 22 pass the heating sections so that the preforms 2 are heated to a temperature condition suited to blow-molding.

At an adjacent position to the semicircular transportation passage part 25 on an opposite side to the second transfer mechanism 18, there is disposed a third transfer mechanism 27 that receives the heated preforms 2 from the transportation passage part 25 with the mandrel carriers 22 and increases the feed pitch from the first feed pitch p1 to the second feed pitch p2 while transporting the preforms 2 along a fifth circular transportation passage 26.

The blow station 6 is disposed adjacent to the third transfer mechanism 27. A turntable 28 and a plurality of blow-molding molds 29 that are aligned at intervals corresponding to the second feed pitch in a concentric circle on a surface of the turntable 28 are provided in the blow station 6. The blow-molding molds 29 are comprised of a pair of molding dies 30, 31 that open laterally, with a mold opening/closing mechanism 33 for opening and closing the molding dies 30, 31 being disposed on a rear surface side of each blow-molding mold 29.

In this blow station 6, by rotation of the turntable 28, the blow-molding molds 29 are circulated at the second feed pitch p2 along a sixth circular transportation passage 34. The respective blow-molding molds 29 receive preforms 2 transported at the second feed pitch p2 along the fifth circular transportation passage 26 described above in an open state, and become a closed state while being transported along the sixth circular transportation passage 34, with the preforms 2 then being subjected to biaxial stretch blow-molding. The PET bottles 5 thus produced are transferred from the blow-molding molds 29 in the open state to a star wheel 35. Arc-shaped grooves 35a are formed at intervals corresponding to the second feed pitch p2 in an outer circumferential surface of the star wheel 35, with the PET bottles 5 being transported by these arc-shaped grooves 35a toward the inverting transfer mechanism 16.

The inverting transfer mechanism 16 receives the PET bottles 5 from the star wheel 35 and while transporting the PET bottles 5 along the third circular transportation passage 14, withdraws the mandrels 15 inserted into the opening parts 2a of the PET bottles 5 in the inverted state downward, and then inverts the PET bottles 5 to place the PET bottles 5 in the upright state. After this, the PET bottles 5 are transferred to the collection station 7 via a star wheel 36.

In the biaxial stretch blow molding apparatus 1 of this construction, an inverting operation for the preforms 2 and the PET bottles 5 that are the blow-molded products, an operation for inserting the mandrels 15 into the opening parts 2a of the preforms 2, and an operation for withdrawing the mandrels 15 downward from the opening parts 2a of the PET bottles 5 are carried out by the inverting transfer mechanism 16. Accordingly, compared to a conventional biaxial stretch blow molding apparatus where these operations are carried out at separate locations, the machine can be made smaller and more compact, and the manufacturing cost can be kept lower.

(Transfer Mechanism)

Figure 2:
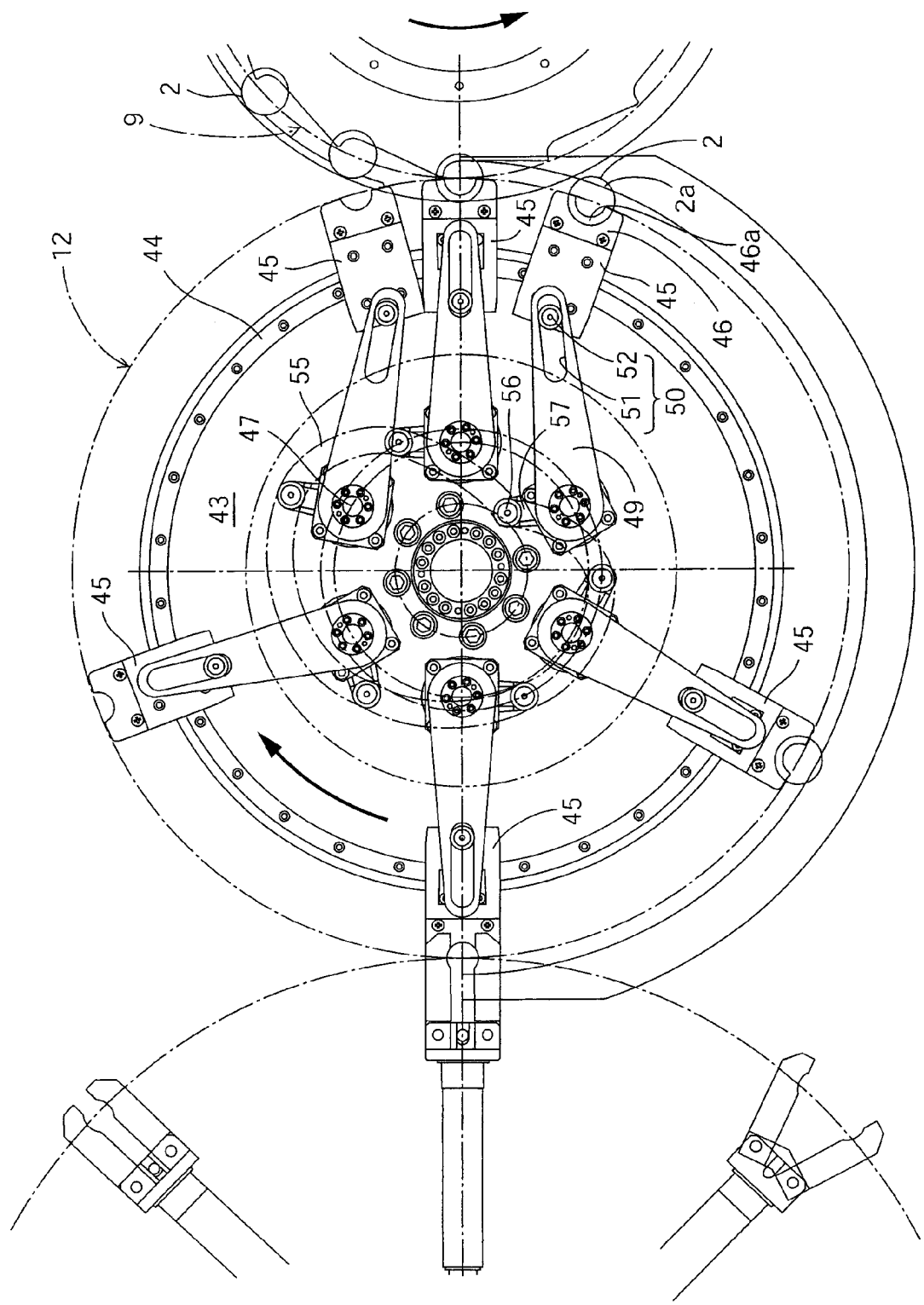
FIG. 2 is a plan view showing a first transfer mechanism in the biaxial stretch blow molding apparatus in FIG. 1.
Figure 3:
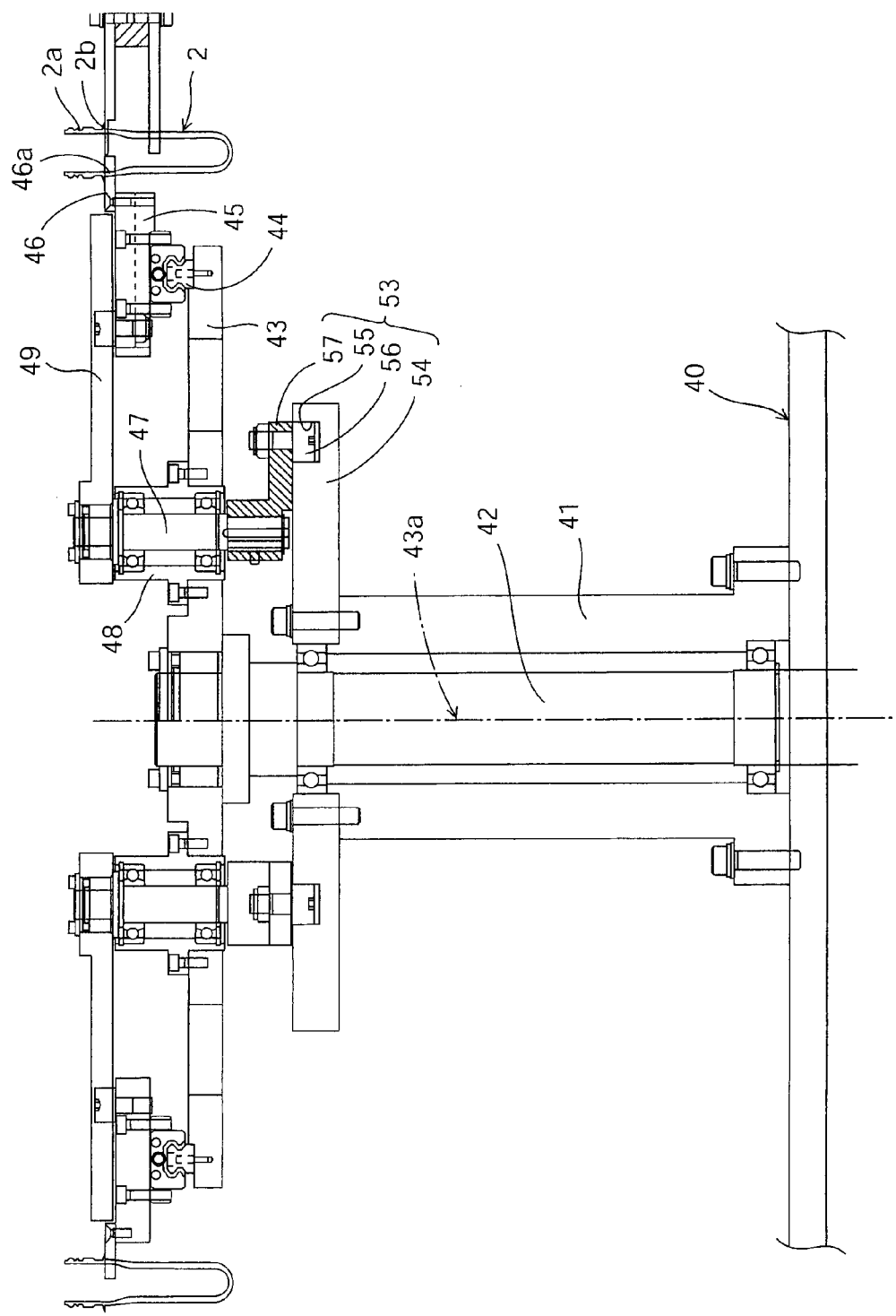
FIG. 3 is a cross-sectional view showing the first transfer mechanism in FIG. 2.

FIG. 2 and FIG. 3 are a plan view and a cross-sectional view, respectively, showing the first transfer mechanism 13 described above. In the illustrated example, the first transfer mechanism 13 is constructed so that it receives the preforms 2 transported at the first feed pitch p1 along the first circular transportation passage 9, increases the feed pitch from the first feed pitch p1 to the second feed pitch p2 while transporting the preforms 2 along the second circular transportation passage 12, and then transfers the preforms 2 to the third circular transportation passage 14 of the inverting transfer mechanism 16.

The first transfer mechanism 13 includes a cylindrical housing 41 perpendicularly fixed to an apparatus base 40 and a rotating shaft 42 coaxially supported in a rotatable manner inside the cylindrical housing 41, with the rotating shaft 42 being rotationally driven by a driving motor, not shown. A disc-like turntable 43 is horizontally fixed to an upper end of the rotating shaft 42 in a coaxial state. A circular guide rail 44 is fixed to a surface of a turntable 43 in a coaxial state, that is, so that a center of the circular guide rail 44 matches a center of rotation 43a of the turntable 43.

A plurality of sliders 45 in the shape of flattened parallelepipeds are slidably attached to the circular guide rail 44 so that they face a radial direction. In the illustrated example, six sliders 45 are attached. A holding plate 46, in which a semicircular groove 46a on which the opening part 2a of the preform 2 can be mounted is formed, is horizontally attached at an outer end of each slider 45.

A plurality of pivot pins 47 are perpendicularly attached in a rotatable manner to a part of turntable 43 that is closer to the center thereof than the circular guide rail 44 concentrically and at intervals of a fixed angle. That is, the respective pivot pins 47 are held in a rotatable state by cylindrical bearing holders 48 that extend through the turntable 43. Inner ends of swinging arms 49 are fixed to upper ends of the pivot pins 47 that protrude upwards from upper ends of the bearing holders 48. The respective swinging arms 49 extend across the surface of the turntable 43 toward its outer circumference, and can swing laterally across the surface of the turntable 43 about the pivot pins 47.

Front ends of the respective swinging arms 49 are linked to inner end parts of the respective sliders 45 via slide-type connecting parts 50. The slide-type connecting parts 50 include slots 51 that are formed in the front ends of the swinging arms 49 and extend in an axial direction of the swinging arms 49, and cam follower pins 52 that can slide along the slots 51, with the cam follower pins 52 being fixed to positions on inner ends in the center of upper surfaces of the sliders 45.

Here, the respective swinging arms 49 are constructed so as to swing laterally by a cam mechanism 53 as the turntable 43 rotates. The cam mechanism 53 includes a fixed disc 54 that is horizontally fixed to the housing 41 at a position a predetermined distance from a rear surface of the turntable 43, a deformed heart-shaped cam groove 55 that is formed in a surface of the fixed disc 54, and roller-type cam followers 56 that slide along the cam groove 55. Lower ends of the pivot pins 47 protrude downward from the rear surface of the turntable 43 base end parts of arms 57 that extend in a direction perpendicular to the swinging arms 49 are fixed thereto, with cam followers 56 being attached to front ends of the arms 57.

The operation of the first transfer mechanism 13 will now be described. When the turntable 43 rotates in a direction shown by an arrow in FIG. 2, the circular guide rail 44, the sliders 45, and the swinging arms 49 mounted thereupon rotate in the same direction. Here, the cam followers 56 of the cam mechanism 53 that are linked to the respective swinging arms 49 slide along the deformed heart-shaped cam groove 55 formed in the fixed disc 54. Since the cam groove 55 traces a path that is a deformed heart shape, as the cam followers 56 slide along the cam groove 55, the cam followers 56 move in the radial direction relative to the pivot pins 47 that are at fixed positions. As a result, the pivot pins 47 are rotated literally, and the swinging arms 49 whose inner ends are fixed to the pivot pins 47 also swing literally. Since the respective sliders 45 are slidably linked to the front ends of the swinging arms 49 in an axial direction of the swinging arms 49, when the swinging arms 49 swing literally, the sliders 45 slide literally along the circular guide rail 44. That is, in accordance with the shape of the deformed heart-shaped cam groove 55, the sliders 45 rotate in the same direction together with the turntable 43 while moving relative to one another to become closer or further apart.

Accordingly, by appropriately setting the shape of the deformed heart-shaped cam groove 55 in advance, it is possible to narrow the interval between the sliders 45 and to transport the sliders at the first feed pitch p1 at a circumscribed position of the second circular transportation passage 12 and the first circular transportation passage 9 that is traced by centers of the holding grooves 46a of the holding plates 46 attached to outer ends of the sliders 45. In addition, at a circumscribed position of the second circular transportation passage 12 and the third circular transportation passage 14 to which the preforms are transferred, the intervals between the sliders 45 are increased and the sliders are transported at the second feed pitch p2. As a result, the preforms 2 that are transported along the first circular transportation passage 9 with the first feed pitch p1 can be received by the holding grooves 46a of the holding plates 46 attached to the front ends of the sliders 45 and the preforms 2 can be transferred to the third circular transportation passage 14 at the second feed pitch p2.

In the first transfer mechanism 13 of this construction, unlike a mechanism where the pitch is changed by extending and retracting swinging arms as in a conventional transfer mechanism for changing pitch, it is sufficient to swing the swinging arms, so the mechanism is simplified. It also becomes simple to assemble the component parts so assembly errors can also be suppressed. Also, since the sliders 45 that swing by the swinging arms 49 slide along the circular guide rail 44, the semi-circular holding grooves 46a of the holding plates 46 attached to the front ends of the sliders 45 always face outward in the radial direction. Accordingly, it is possible to reliably carry out the transfer operation for the preforms transported along the circular transportation passages.

It should be noted that since a second transfer mechanism 18 and a third transfer mechanism 27 are constituted in the same way as the first transfer mechanism 13 described above, description thereof has been omitted.

(Inverting Transfer Mechanism)

Figure 4:
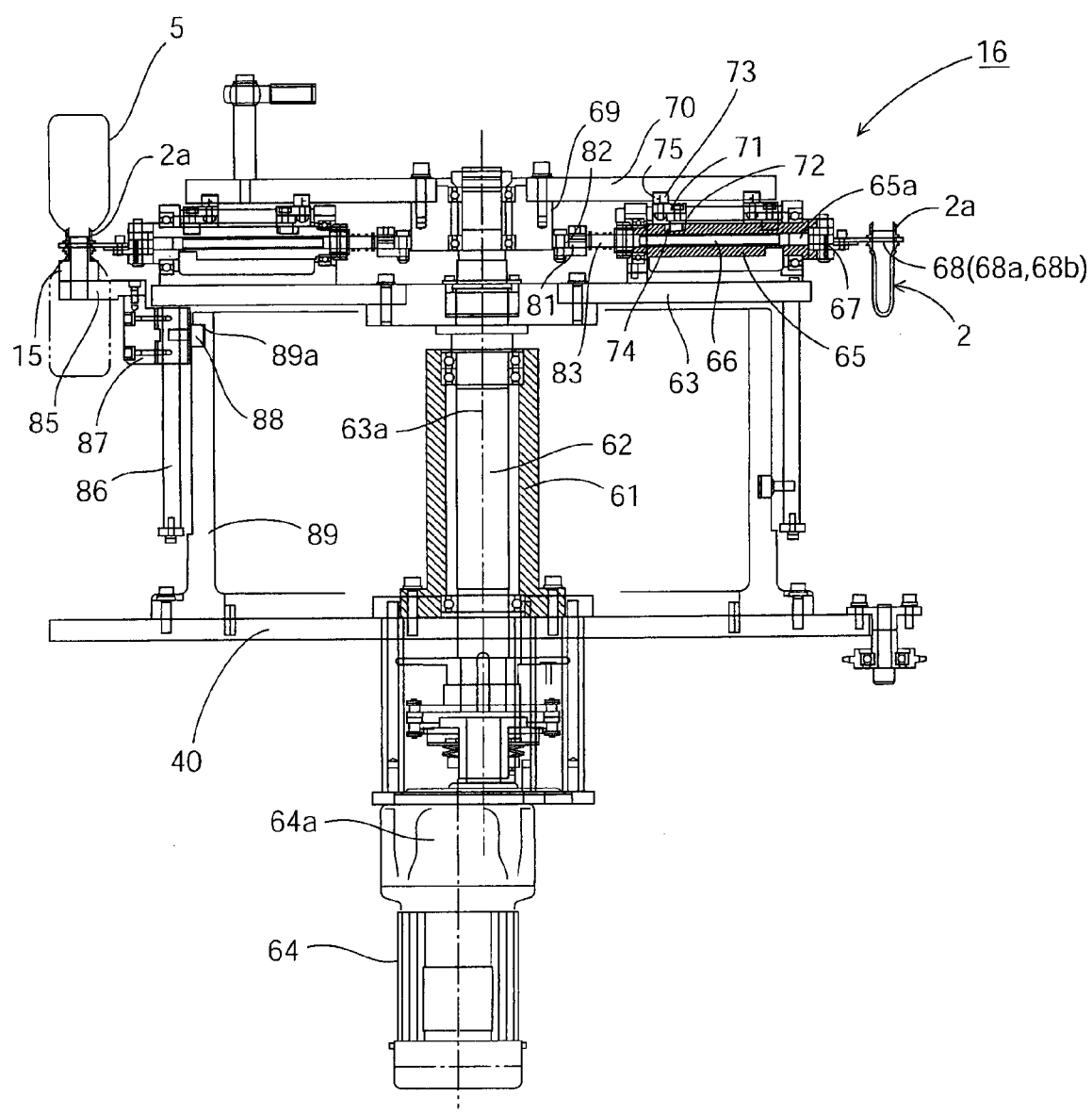
FIG. 4 is a cross-sectional view showing an inverting transfer mechanism of the biaxial stretch blow molding apparatus in FIG. 1.
Figure 5:
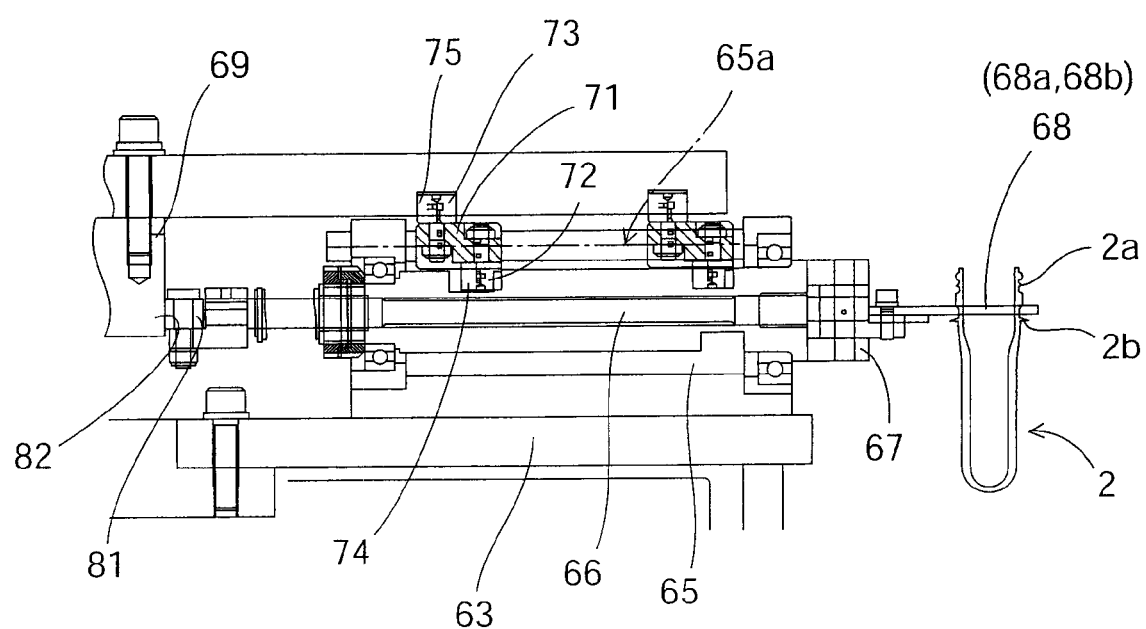
FIG. 5 is an enlarged partial cross-sectional view of the inverting transfer mechanism in FIG. 4.

Next, FIG. 4 and FIG. 5 are a cross-sectional view and an enlarged partial cross-sectional view, respectively, showing the inverting transfer mechanism 16. As described above, the inverting transfer mechanism 16 receives the preforms 2 in an upright state being transported along the second circular transportation passage 12 of the first transfer mechanism 13, inverts the posture of the preforms 2 to the inverted state and then inserts the mandrels 15 into the opening parts 2a from below while transporting the preforms 2 along the third circular transportation passage 14, and then transfers the preforms 2 to the fourth circular transportation passage 17 of the second transfer mechanism 18. Also, the inverting transfer mechanism 16 receives the PET bottles 5 in the inverted state from the respective blow-molding molds 29 of the blow station 6, withdraws the mandrels 15 downward from the opening parts 2a and inverts the posture to make the PET bottles 5 upright while transporting the PET bottles 5 along the third circular transportation passage 14, and then transfers the PET bottles 5 to the star wheel 36 of the collection station 7.

In the example illustrated in FIGS. 1, 4, and 5, the inverting transfer mechanism 16 includes a cylindrical housing 61 perpendicularly fixed to an apparatus base 40 and a rotational shaft 62 rotatably supported inside the housing 61 in a coaxial state, with a turntable 63 being horizontally fixed in a coaxial state to an upper end part of the rotational shaft 62. The turntable 63 is rotationally driven by a driving motor, not shown, via the rotational shaft 62.

A plurality of cylindrical members 65 are radially disposed on a surface of the turntable 63 in a horizontal state at intervals of fixed angle about a center of rotation 63a, with the respective cylindrical members 65 being rotatably supported on the surface of the turntable 63 about axes 65a thereof. In the illustrated example, eight cylindrical members 65 are arranged. On each cylindrical member 65, a slide shaft 66 is disposed in an coaxial state so as to pass through a hollow part of the cylindrical member 65, with the slide shaft 66 integrally rotating with the cylindrical member 65 and being capable of sliding with respect to the cylindrical members 65 in a direction of an axis 65a.

On an outer end of each cylindrical member 65, a gripper 68 with a pair of opening/closing arms 68a, 68b that can hold the opening part 2a of the preform 2 and the PET bottle 5 from both sides is linked thereto via a link mechanism 67. The preforms 2 and the PET bottles 5 held on the respective grippers 68 are transported along the third circular transportation passage 14 when the turntable 63 is rotated.

The upper end of the perpendicular rotational shaft 62 is rotatably supported by a bearing supported by a cylindrical bearing holder 69, with the bearing holder 69 being fixed to a side of the apparatus base via a horizontal fixing disc 70 that is concentrically fixed to an upper end surface thereof.

Here, inverting cam mechanisms are provided that each rotate the gripper 68 connected to the front end of the cylindrical member 65 as the turntable 63 rotates and thereby inverts the preform 2 or PET bottle 5 held by the gripper 68. This inverting cam mechanism includes a slider 71 capable of reciprocal movement in the direction of an axis 65a of the cylindrical member 65 at an upper position on the cylindrical member 65, a first cam follower 72 attached to a lower surface of the slider 71, and a second cam follower 73 attached to an upper surface of the slider 71. A screw-like first cam groove 74 spirally formed across along an outer circumferential surface of the cylindrical member 65 in a range of 180° is also provided. The first cam follower 72 slides along this cam groove 74. In addition, a second cam groove 75 formed in a rear surface of the horizontal fixing disc 70 is provided, with the second cam follower 73 sliding along this cam groove 75.

By setting the shape of the second cam groove 75 appropriately in advance, when the turntable 63 rotates, the second cam follower 73 that slides along the cam groove 75 can be reciprocally moved in the direction of the axis 65a of the cylindrical member 65. The slider 71 attached by the second cam follower 73 is also attached by the first cam follower 72, and when the first cam follower 72 moves reciprocally in the direction of the axis 65a, the rotatably supported cylindrical member 65 rotates by 180°, so that the slide shaft 66 and the link mechanism 67 that integrally rotate with the cylindrical member 65 also rotate by 180°. The gripper 68 linked to the front end of the cylindrical member 65 can also be rotated by 180°.

Next, the opening/closing cam mechanism in which the slide shaft 66 slides in the direction of the axis 65a to open and close the gripper 68 will be described. The opening/closing mechanism includes a cylindrical cam surface 81 formed on an outer circumferential surface of the bearing holder 69, a roller 82 attached to an inner end of the slide shaft 66, and a coil spring 83 that presses the roller 82 onto the cylindrical cam surface 81. As the turntable 63 rotates, the roller 82 of the slide shaft 66 moves along the cylindrical cam surface 81. Therefore, by setting the outline form of the cylindrical cam surface 81 appropriately in advance, the slide shaft 66 can be reciprocally moved along the axis 65a. The link mechanism 67 that links the front end of the slide shaft 66 and the gripper 68 operates so that the opening/closing arms 68a, 68b of the gripper 68 are pressed open laterally when the slide shaft 66 is pushed outward and the opening/closing arms 68a, 68b are closed when the slide shaft 66 is pulled inward.

Next, a mandrel holder 85 for inserting the mandrels 15 into the opening parts 2a of the preforms 2 or the PET bottles 5 from below and for withdrawing the mandrels 15 downward from the opening parts 2a is disposed directly below the respective grippers 68 that protrude outward from an outer circumferential edge of the turntable 63. The mandrel holder 85 is attached to a vertical slider 87 that rises and falls along a guide shaft 86 extending perpendicularly below from a position corresponding to the respective grippers 68 on the rear surface of the turntable 63. A cam follower 88 is fixed to the vertical slider 87, with the cam follower 88 sliding along a cylindrical cam groove 89a formed in an outer circumferential surface of a cylindrical member 89 fixed to the apparatus base 40. By appropriately setting the cylindrical cam groove 89a, as the turntable 63 rotates, the mandrel holder 85 is raised and lowered so that the mandrel 15 can be inserted from below into the opening part 2a of the preform 2 in the inverted state. It is also possible to withdraw the mandrel 15 downward from the opening part 2a of the PET bottle 5 in the inverted state.

As shown in FIG. 1, in the present embodiment, the preform 2 is inverted to the inverted state in a section 14a of the third circular transportation passage 14, and the mandrel 15 is inserted from below into the opening part 2a of the preform 2 in the inverted state in a former half of a subsequent section 14b. Also, the mandrel 15 is withdrawn downward from the opening part 2a of the PET bottle 5 in the inverted state in a section 14c, and then the PET bottle 5 is inverted to become the upright state in a subsequent section 14d.

In the inverting transfer mechanism 16 of the above construction, the inverting of the preforms 2, the inserting of the mandrels 15, the withdrawing of the mandrels 15 from the PET bottles 5, and the inverting of the PET bottles 5 can be carried out as a single turntable 63 rotates. Accordingly, compared to a conventional blow molding apparatus constructed so that the respective operations are carried out on turntables disposed at four locations, it is possible to make the transportation path more compact, whereby a reduction can be made in the apparatus dimensions and the manufacturing cost can also be reduced.

(Mold Opening/Closing Mechanism)

Figure 6:
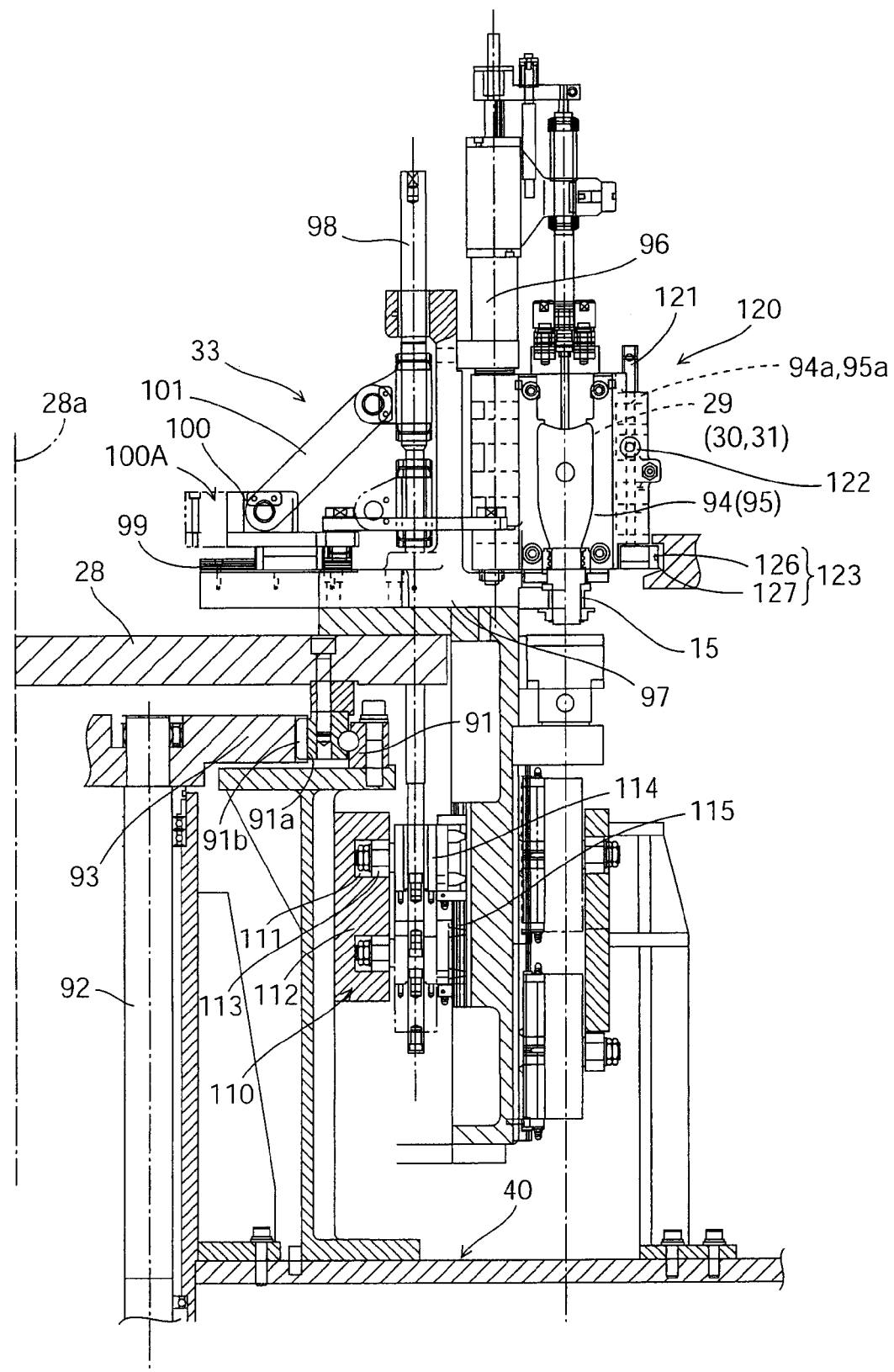
FIG. 6 is a partial cross-sectional view showing a rotary-type blow station in the biaxial stretch blow molding apparatus in FIG. 1.
Figure 7:
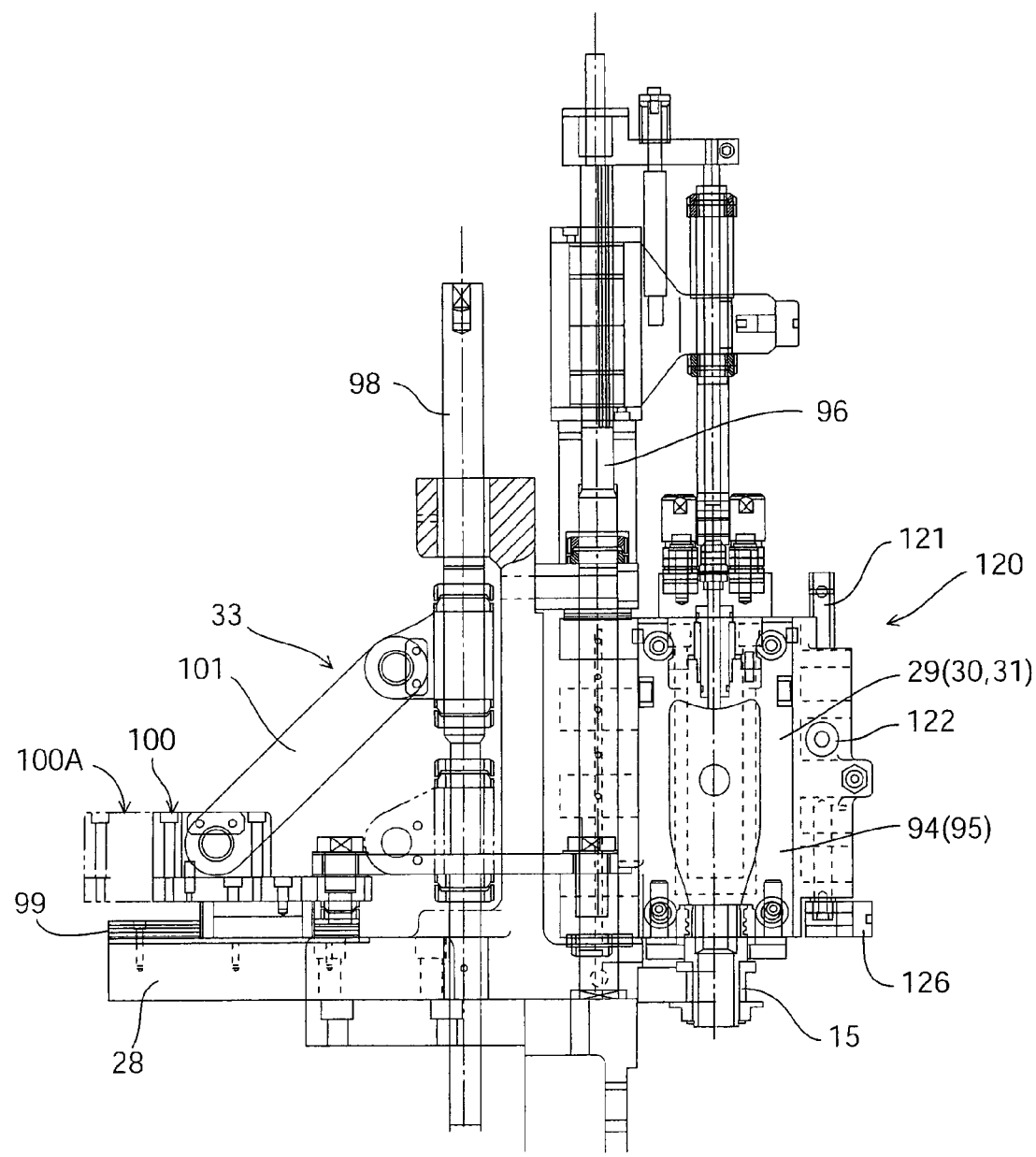
FIG. 7 is a partial cross-sectional view showing a mold opening/closing mechanism for the blow-molding molds in FIG. 6.
Figure 8:
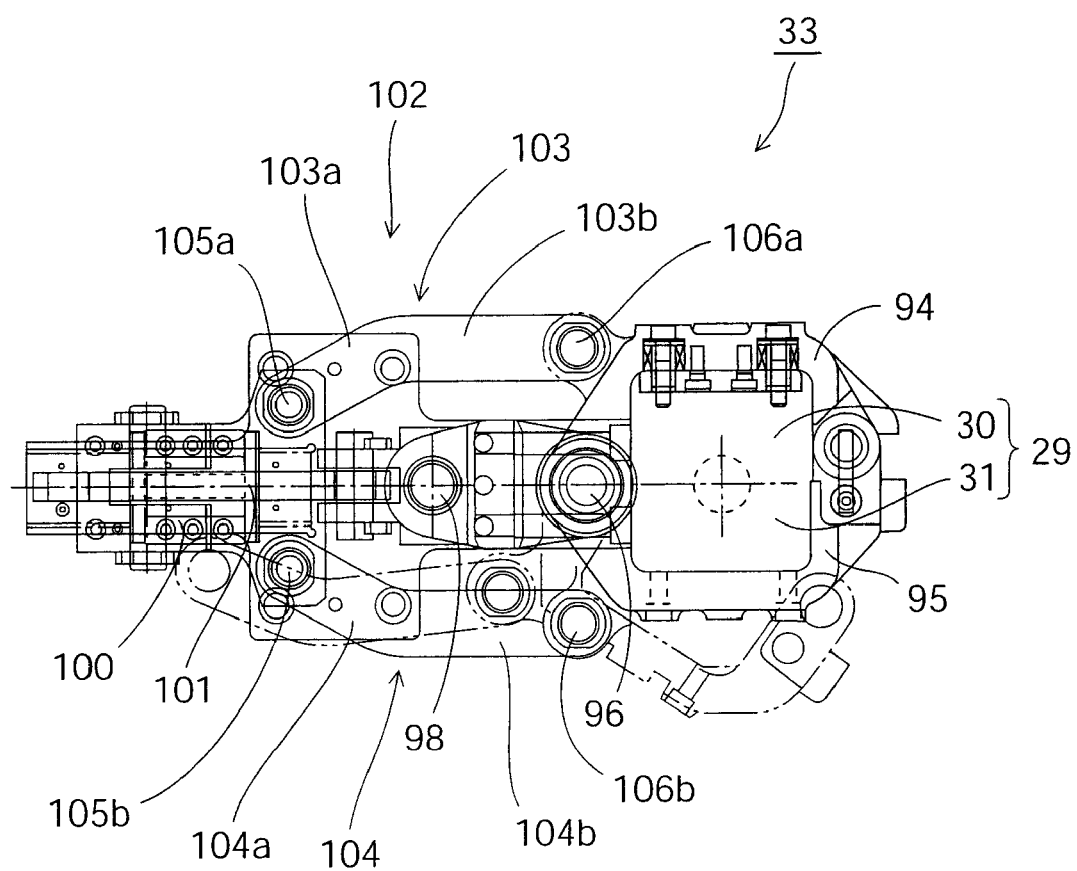
FIG. 8 is a plan view showing the construction of the mold opening/closing mechanism for the blow-molding molds in FIG. 6.
Figure 9:
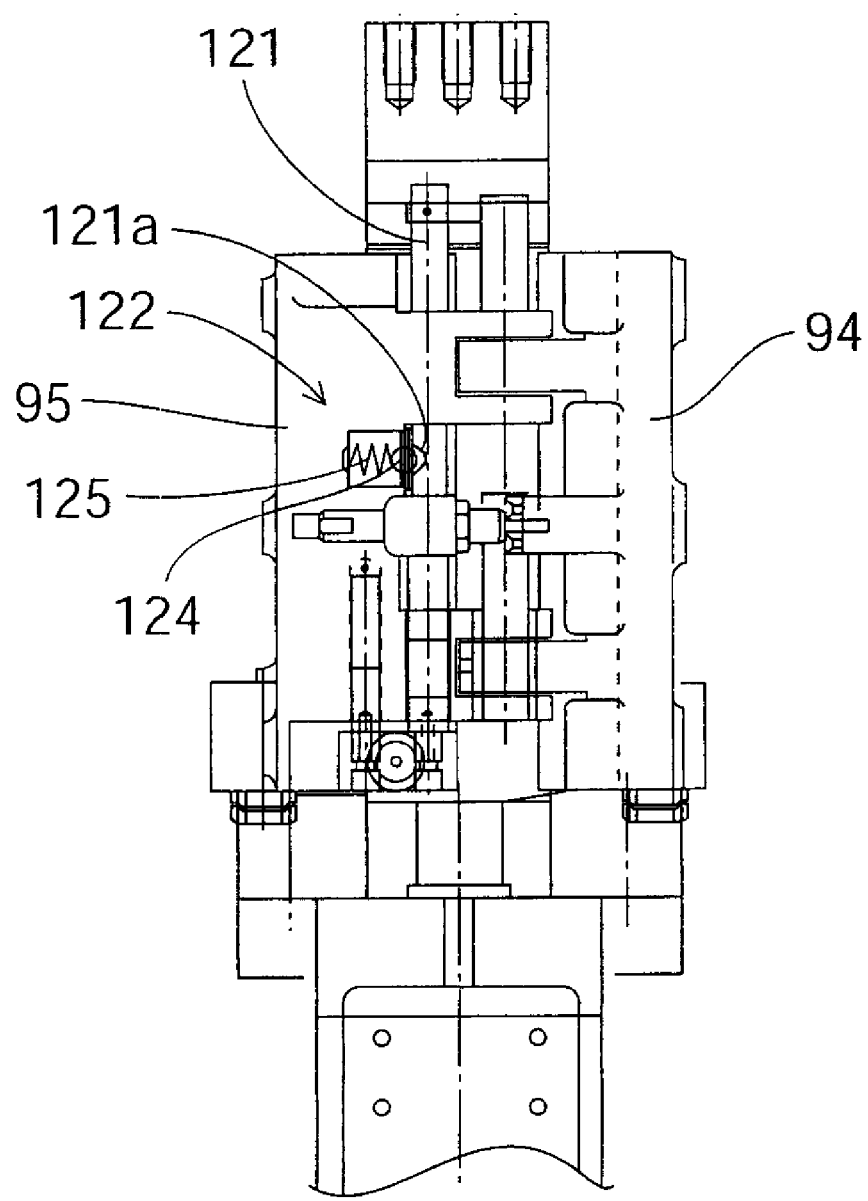
FIG. 9 is a side view showing a side surface of an opening/closing end side of the mold opening/closing mechanism in FIG. 6.
Figure 10:
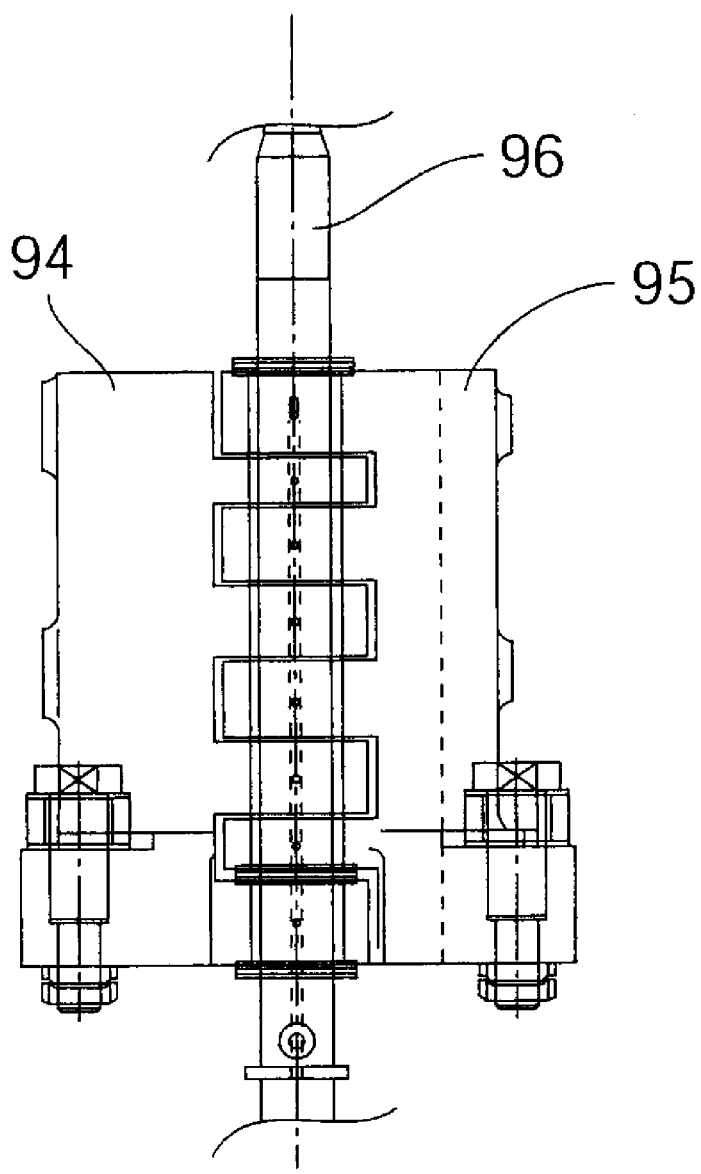
FIG. 10 is a side view showing a side surface of an opening/closing center side of the mold opening/closing mechanism in FIG. 6.

Next, FIG. 6 is a partial cross-sectional view showing the rotary-type blow station 6, FIG. 7 is a partial cross-sectional view showing the mold opening/closing mechanism 33 of the blow-molding mold 29, and FIG. 8 is a plan view showing the structure of the mold opening/closing mechanism 33. Also, FIG. 9 is a side view showing the opening/closing end side of the mold opening/closing mechanism, and FIG. 10 is a side view showing an opening/closing center side of the mold opening/closing mechanism. An overall construction of the blow station 6 and the mold opening/closing mechanisms 33 of the blow-molding molds 29 will now be described with reference to these drawings.

As described above, the blow station 6 is a rotary-type station in which the plurality of blow-molding molds 29 circulates at the second feed pitch p2 along the sixth circular transportation passage 34 on the turntable 28. The turntable 28 is supported horizontally in a rotatable state about the central rotational axis 28a by a thrust bearing 91 supported on the apparatus base 40. That is, the turntable 28 is fixed to an inner ring 91a of the thrust bearing 91, with an inner gear 91b being formed in an inner circumferential surface of the inner ring 91a. The inner gear 91b engages with a driving external gear 93 that is coaxially fixed to an upper end of a vertical rotational shaft 92 rotationally driven by a driving motor, not shown. This driving motor rotates the turntable 28 about the central rotational axis 28a thereof.

The respective blow-molding molds 29 include the molding dies 30, 31 that can open and close laterally, with the molding dies 30, 31 being respectively supported by left and right mold support members 94, 95 fixed to outer surfaces thereof. The mold support members 94, 95 can open and close laterally about a vertical shaft 96, with the vertical shaft 96 being supported by a mold support plate 97 fixed to an upper surface of the turntable 28.

The mold support members 94, 95 that support the left and right molding dies 30, 31 are opened and closed laterally by the mold opening/closing mechanism 33 comprised of the link mechanism. The mold opening/closing mechanism 33 includes a vertical moving shaft 98 disposed at a position on a rear surface side of the vertical shaft 96 (in the center of the turntable 28), with the vertical moving shaft 98 extending through the mold support plate 97 and the turntable 28. A slide guide 99 attached to the mold support plate 97 is disposed at a position on a rear surface-side of the vertical moving shaft 98 (toward the center of the turntable 28). The slide guide 99 extends from the blow-molding molds 29 toward the central rotational axis 28a of the turntable 28 and a slider 100 can slide along the slide guide 99. The slider 100 and a part of the vertical moving shaft 98 that protrudes above the mold support plate 97 are linked by a linking arm 101 that is attached thereto by pins.

The slider 100 and the left and right mold support members 94, 95 are linked by an opening/closing link mechanism 102 that converts the sliding movement of the slider 100 to the opening and closing movement of the mold support members 94, 95. As can be easily understood from FIG. 8, the opening/closing link mechanism 102 includes a left and right pair of operation arms 103, 104. The pair of operation arms 103, 104 are formed symmetrically, and include bent arm parts 103a, 104a that are linked at one end to the slider 100 so as to pivot laterally on liking pins 105a, 105b and extend spreading laterally from the linked end, and parallel arm parts 103b, 104b that extend in parallel to one another from front ends of the bent arm parts 103a, 104a. Front ends of the parallel arm parts 103b, 104b are linked to both ends on a rear surface side of the mold support members 94, 95 so that they pivot laterally on linking pins 106a, 106b.

In the state where the mold is closed, the mold opening/closing mechanism 33 is in the state shown by solid lines in FIG. 6 and FIG. 8. When the vertical moving shaft 98 is lowered from this state, the slider 100 slides horizontally direction toward the center of the turntable 28 and reaches a position 100A shown by imaginary lines. When the slider 100 slides, the left and right operation arms 103, 104 linked to the slider 100 move as a whole toward the center of the turntable 28. As a result, the left and right mold support members 94, 95 linked to the ends of the operation arms 103, 104 open laterally about the vertical shaft 96 and become placed in positions shown by the imaginary lines in FIG. 8, and the left and right molding dies 30, 31 supported by the mold support members 94, 95 open. Thereby a state is produced in which the mold is open. In this state, if the vertical moving shaft 98 rises and returns to the position shown by the solid lines in FIG. 6, the slider 100 slides so as to approach the blow-molding mold 29, so that the left and right mold support members 94, 95 linked to the ends of the operation arms 103, 104 become closed one another about the vertical shaft 96, thereby producing the mold closed state.

Here, the raising and lowering of the vertical moving shaft 98 are carried out by a vertical moving cam mechanism 110. The vertical moving cam mechanism 110 includes a cam follower 111 attached to a lower end part of the vertical moving shaft 98 and a cylindrical cam groove 113 formed in an outer circumferential surface of a cylindrical member 112 supported on the apparatus base 40. When the turntable 28 rotates, the cam follower 111 slides along the cam groove 113. When the cam groove 113 is made to rise and fall in accordance with the rotational position of the turntable 28, the vertical moving shaft 98 can be raised and lowered in accordance with the rotation of the turntable 28. That is, the blow-molding molds 29 can be opened and closed in accordance with the rotational angle position of the turntable 28.

It should be noted that a vertical slider 114 is fixed to a lower end part of the vertical moving shaft 98, and is set to rise and fall along a vertical slide guide 115 that is attached to a vertical plate part formed on the mold support plate 97 and extending vertically downward.

Next, at opening and closing ends of the left and right mold support members 94, 95, a closing mechanism 120 for holding the mold support members in the closed state is provided. The closing mechanism 120 includes a vertically movable stopping pin 121, pin holes 94a, 95a formed in the opening and closing ends of the mold support members 94, 95 and into which the stopping pin 121 can be inserted from below, and a locking mechanism 122 for locking the stopping pin 121 in a state where the stopping pin 121 is inserted into the pin holes 94a, 95a. Also included is a cam mechanism 123 that raises and lowers the stopping pin 121.

The locking mechanism 122 is comprised of a plunger including a groove 121a formed in an outer circumferential surface of the stopping pin 121, a ball 124 that can fit into the groove 121a and is disposed on a mold supporting member side, and a coil spring 125 that biases the ball 124 toward the outer circumferential surface of the stopping pin 121. The cam mechanism 123 includes a cam follower 126 attached to a lower end of the stopping pin 121 and a cam groove 127 in which the cam follower 126 slides. The cam groove 127 is a cam groove formed in a circular inner circumferential surface of a member supported by the apparatus base 40.

In accordance with the rotational position of the turntable 28, the stopping pin 121 is lowered to a locking position shown in FIGS. 6, 7, and 9, and rises to a position away from the pin holes 94a, 95a. In conjunction with the opening and closing of the mold opening/closing mechanism 33, the stopping pin 121 is raised and lowered, and in the mold closed state, the closed state is held by the stopping pin 121. Also, in the opened state, the stopping pin 121 is prevented from falling from the pin holes 94a, 95a by the lock mechanism comprised of the plunger.

In the mold opening/closing mechanism 33 of a blow-molding mold 29 described above, the raising and lowering movement of the vertical moving shaft 98 are converted to sliding movement of the slider 100, and the sliding movement of the slider 100 is converted via the pair of operation arms 103, 104 to the opening and closing movement of the mold support members 94, 95 that support the left and right molding dies 30, 31. Accordingly, compared to a conventional mold opening/closing mechanism that opens and closes the mold using a link mechanism composed of three or more arms, the mold opening/closing mechanism can be made small and compact. In particular, a length of the mechanism from the rear surface of the blow-molding molds 29 toward the center of the turntable can be reduced. As a result, the thrust bearing 91 that rotatably supports the turntable 28 can be disposed at the position close to underneath the blow-molding molds 29. Therefore, the rotational movement of the turntable 28 on which the heavy blow-molding molds are mounted can be carried out smoothly.

The locking mechanism 122 for locking the left and right mold support members 94, 95 in the closed state is constructed so that the ball 124 is fit into the groove 121a formed in the outer circumferential surface of the stopping pin 121, the stopping pin 121 can therefore be fixed reliably.

INDUSTRIAL APPLICABILITY

As described above, according to the transfer mechanism of the blow molding apparatus of the present invention, sliders including holding parts that hold the preform or the like along the circular guide rail are slidably disposed, and by causing the respective sliders to slide left and right in accordance with rotation of the turntable, the feed pitch of the preforms and the like held on the holding parts is changed.

Accordingly, compared to a conventional mechanism where the feed pitch of preforms and the like held by holding parts are changed by a combination of swing movement and linear movement, the structure can be simplified and the feed pitch can be changed precisely. Also, since the holding parts attached to the sliders that slide along the circular guide rail is always held to be oriented in the radial direction of the turntable, the operation of receiving preforms and the like transported along the circular transportation passage and the operation of transferring the preforms and the like to the circular transportation passage can be carried out reliably.

Next, the inverting transfer mechanism of the blow molding apparatus according to the present invention is constituted so that the operation of receiving and inverting the preforms, the operation of inserting mandrels into opening parts of the inverted preforms, the operation of receiving the blow-molded products and withdrawing mandrels from the opening parts, and the operation of inverting the blow-molded products after the mandrels have been withdrawn are carried out in accordance with the rotation of the turntable. Accordingly, compared to a conventional blow molding apparatus where these operations are carried out using separate turntables, the transportation mechanism of the preforms and the blow-molded products can be constituted to be smaller and more compact. Since the transportation passage can be shortened, the manufacturing efficiency is also improved.

Next, in the mold opening/closing mechanism of the blow molding apparatus according to the present invention, vertical movement of the vertical moving shaft is converted into sliding movement of the slider and the sliding movement is converted to the opening/closing movement that opens and closes the mold support members laterally using a pair of operation arms. Accordingly, compared to a conventional mold opening/closing mechanism constructed of a link mechanism using three or more operation arms, it is possible to constitute the mold opening/closing mechanism to be smaller and more compact.

In particular, in the case of the rotary-type blow station where blow-molding molds are mounted on the turntable, the bearing member of the turntable can be disposed at the position close to beneath the blow-molding molds without interfering with mold opening/closing mechanisms set at positions on the rear surface side of the blow-molding molds. As a result, there is the effect that it is possible to smoothly rotate the turntable on which heavy blow-molding molds are mounted.

Because the blow molding apparatus according to the present invention includes the transfer mechanism, the inverting transfer mechanism, and the mold opening/closing mechanism described above, it is possible to achieve a small and compact overall structure. It is also possible to transport the preforms and blow-molded products reliably and efficiently.

The invention claimed is:

1. A blow molding apparatus that includes a preform supplying station for supplying preforms in an upright state, a heating station for heating the preforms to a suitable temperature condition for blow-molding while transporting the preforms, a blow station for blowing the heated preforms to form blow-molded products, and a collection station for collecting the blow-molded products, comprising:
   a first circular transportation passage that transports the preforms supplied from the preform supplying station at a first feed pitch;
   a first transfer mechanism that receives the preforms from the first circular transportation passage and changes the feed pitch to a second feed pitch that is wider than the first feed pitch while transporting the preforms along a second circular transportation passage;
   an inverting transfer mechanism that receives the preforms transported at the second feed pitch from the second circular transportation passage, inverts the preforms to an inverted state while transporting the preforms alone a third circular transportation passage, and then inserts mandrels into opening parts of the preforms in the inverted state from below;
   a second transfer mechanism that receives, from the third circular transportation passage, the preforms transported in a state where the mandrels are inserted and changes the feed pitch from the second feed pitch to the first feed pitch while transporting the preforms along a fourth circular transportation passage;
   an arc-shaped transportation passage part that is formed in the heating station and receives the preforms in the state where the mandrels are inserted from the fourth circular transportation passage; and
   a third transfer mechanism that receives the heated preforms from the arc-shaped transportation passage part and changes the feed pitch from the first feed pitch to the second feed pitch while transporting the preforms along a fifth circular transportation passage,
   wherein in the blow station, the preforms transported at the second feed pitch along the fifth circular transportation passage are received by blow-molding molds that are transported at the second feed pitch along a sixth circular transportation passage,
   the inverting transfer mechanism receives the blow-molded products from the blow-molding molds, withdraws the mandrels inserted in the opening parts of the blow-molded products in an inverted state downward while transporting the blow-molded products along the third circular transportation passage, and then inverts the blow-molded products in an inverted state to an upright state,
   the blow-molded products are collected from the inverting transfer mechanism by the collection station, and
   wherein the first, second, and third transfer mechanisms comprise:
   a turntable;
   a circular guide rail fixed to a surface of the turntable so that a center thereof is at a rotational center of the turntable;
   a plurality of sliders capable of sliding along the circular guide rail;
   holding parts formed on the respective sliders and hold the performs or blow-molded products;
   pivot pins that are rotatably disposed at intervals of a fixed angle on a circle that is concentric with the rotational center of the turntable in an inside position of the circular guide rail on the turntable;
   a plurality of swinging arms that swing along a surface of the turntable about the respective pivot pins as the turntable rotates; and
   slide-type linking parts that link swinging ends of the swinging arms to the respective sliders so as to allow the sliders to slide in an axial direction of the swinging arms.

2. The blow molding apparatus according to claim 1, comprising a swinging cam mechanism that causes the swinging arms to swing as the turntable rotates,
   wherein the swinging cam mechanism includes arms extending in a perpendicular direction from the respective pivot pins, cam followers attached to front ends of the arms, and a fixed disc formed with a cam groove along which the cam followers slide.

3. The blow molding apparatus according to claim 1, wherein the inverting transfer mechanism comprises:
   a turntable;
   cylindrical members that extend radially on a surface of the turntable with a center of rotation of the turntable as a center and are rotatably supported by the turntable;
   shaft members that extend through hollow portions of the cylindrical members and rotate integrally with the cylindrical members;
   grippers that are attached to outer ends of the shaft members, are each capable of holding an opening part of the preform or the blow-molded product, and move along the second circular transportation passage when the turntable rotates;
   a rotating cam mechanism that causes the cylindrical members to rotate by 180. degree. as the turntable rotates; and
   an inserting/withdrawing mechanism for inserting and withdrawing mandrels into opening parts of the preforms or blow-molded products in an inverted state.

4. The blow molding apparatus according to claim 3, wherein the rotating cam mechanism comprises:
   first and second cam followers formed on sliders capable of reciprocal movement in an axial direction of each cylindrical member;
   first cam grooves, each of which is formed in a spiral across a 180. degree. angle range in an outer circumferential surface of each cylindrical member and along which the respective first cam followers slide; and
   a second cam groove that is formed in a surface of a fixed disc and along which the respective second cam followers slide, wherein a shape of the second cam groove is set so that the sliders move reciprocally in a radial direction in accordance with rotation of the turntable.

5. The blow molding apparatus according to claim 4, wherein the grippers respectively include a pair of opening/closing arms that are capable of opening and closing,
   further comprising arm opening/closing mechanisms that open and close the opening/closing arms, and
   each arm opening/closing mechanism having a sliding cam mechanism that causes a shaft member to slide in an axial direction of the cylindrical member and a link mechanism that converts sliding of the shaft member to an opening/closing operation of the opening/closing arms.

6. The blow molding apparatus according to claim 3:
   wherein the inserting/withdrawing mechanism includes a mandrel support member capable of rising and falling at a position directly below the respective grippers, and a vertical moving cam mechanism that raises and lowers the mandrel support member in accordance with rotation of the turntable.

7. The blow molding apparatus according to claim 4:

wherein the inserting/withdrawing mechanism includes a mandrel support member capable of rising and falling at a position directly below the respective grippers, and a vertical moving cam mechanism that raises and lowers the mandrel support member in accordance with rotation of the turntable.

8. The blow molding apparatus according to claim 5:

wherein the inserting/withdrawing mechanism includes a mandrel support member capable of rising and falling at a position directly below the respective grippers, and a vertical moving cam mechanism that raises and lowers the mandrel support member in accordance with rotation of the turntable.

9. The blow molding apparatus according to claim 1, wherein the blow-molding molds are respectively constructed of a pair of molding dies capable of opening and closing in a lateral direction, further comprising a mold opening/closing mechanism for opening and closing the blow-molding molds in the lateral direction, that has:

a turntable on which a plurality of blow-molding molds are mounted at intervals of a fixed angle;

a vertical moving shaft that rises and falls as the turntable rotates;

a slider that slides in a direction perpendicular to an opening/closing direction of the blow-molding molds as the vertical moving shaft rises and falls; and a pair of operation arms that convert sliding movement of the slider to opening/closing movement of the blow-molding molds.

10. The blow molding apparatus according to claim 9, wherein the vertical moving shaft is disposed between the slider and the pair of molding dies.

11. The blow molding apparatus according to claim 10, comprising left and right mold supporting members that support the respective molding dies; and a closing mechanism that holds the mold supporting members in a closed state, wherein the closing mechanism includes a vertical movable stopping pin, pin holes formed in opening/closing ends of the mold support members into which the stopping pin can be inserted from above, and a lock mechanism for locking the stopping pin in a state where the stopping pin is withdrawn from the pin holes, and the locking mechanism includes a concavity formed in an outer circumferential surface of the stopping pin, a ball disposed on the mold support member so as to be capable of fitting into the concavity, and a spring member that biases the ball towards the stopping pin.

* * * * *